(12) United States Patent
Gerligand et al.

(10) Patent No.: US 11,454,823 B2
(45) Date of Patent: Sep. 27, 2022

(54) SOFT CONTACT LENS WITH REDUCED VOLUME VARIATION

(71) Applicant: Johnson & Johnson Vision Care, Inc., Jacksonville, FL (US)

(72) Inventors: Pierre-Yves Gerligand, St. Johns, FL (US); Philippe F. Jubin, Fernandina Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 312 days.

(21) Appl. No.: 16/411,423

(22) Filed: May 14, 2019

(65) Prior Publication Data

US 2020/0363653 A1 Nov. 19, 2020

(51) Int. Cl.
*G02C 7/02* (2006.01)
*G02C 7/04* (2006.01)
*B29D 11/00* (2006.01)

(52) U.S. Cl.
CPC ........ *G02C 7/022* (2013.01); *B29D 11/00009* (2013.01); *B29D 11/00019* (2013.01); *B29D 11/00038* (2013.01); *G02C 7/024* (2013.01); *G02C 7/047* (2013.01); *G02C 7/048* (2013.01); *G02C 7/049* (2013.01)

(58) Field of Classification Search
CPC ........ G02C 7/022; G02C 7/024; G02C 7/048; G02C 7/049; G02C 7/047; B29D 11/00038; B29D 11/00019; B29D 11/00009
See application file for complete search history.

(56) References Cited

U.S. PATENT DOCUMENTS

| | | | |
|---|---|---|---|
| 5,100,226 A * | 3/1992 | Freeman | G02C 7/044 351/159.11 |
| 6,183,082 B1 * | 2/2001 | Clutterbuck | G02C 7/04 351/159.02 |
| 9,389,434 B2 | 7/2016 | Jubin et al. | |
| 2011/0166652 A1 | 7/2011 | Bogaert et al. | |
| 2015/0146171 A1 * | 5/2015 | Wildsmith | G02C 7/048 351/246 |
| 2017/0108709 A1 | 4/2017 | Woodland et al. | |
| 2017/0146822 A1 | 5/2017 | Wildsmith et al. | |

* cited by examiner

*Primary Examiner* — Cara E Rakowski

(57) ABSTRACT

Ophthalmic lenses are described herein. An example ophthalmic lens may comprise a first surface. The example ophthalmic lens may comprise a second surface disposed opposite the first surface and defining a volume of lens material therebetween. The ophthalmic lens may exhibit a first cylinder power. A difference of the volume of lens material of the ophthalmic lens and a volume of lens material of a comparative lens may be minimized. The comparative lens may consist essentially of the same lens material as the ophthalmic lens and exhibit a second cylinder power different from the first cylinder power.

10 Claims, 10 Drawing Sheets

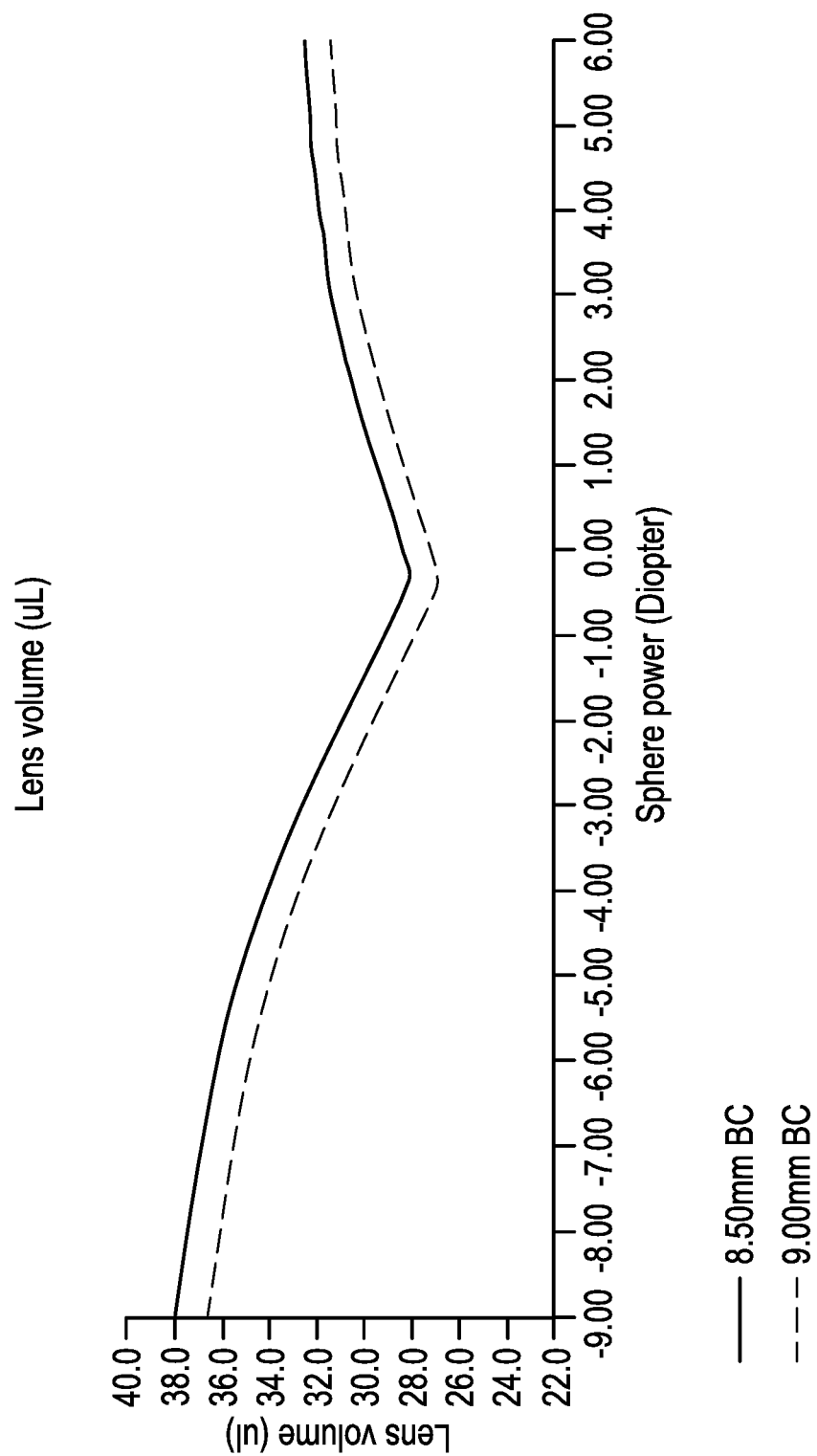

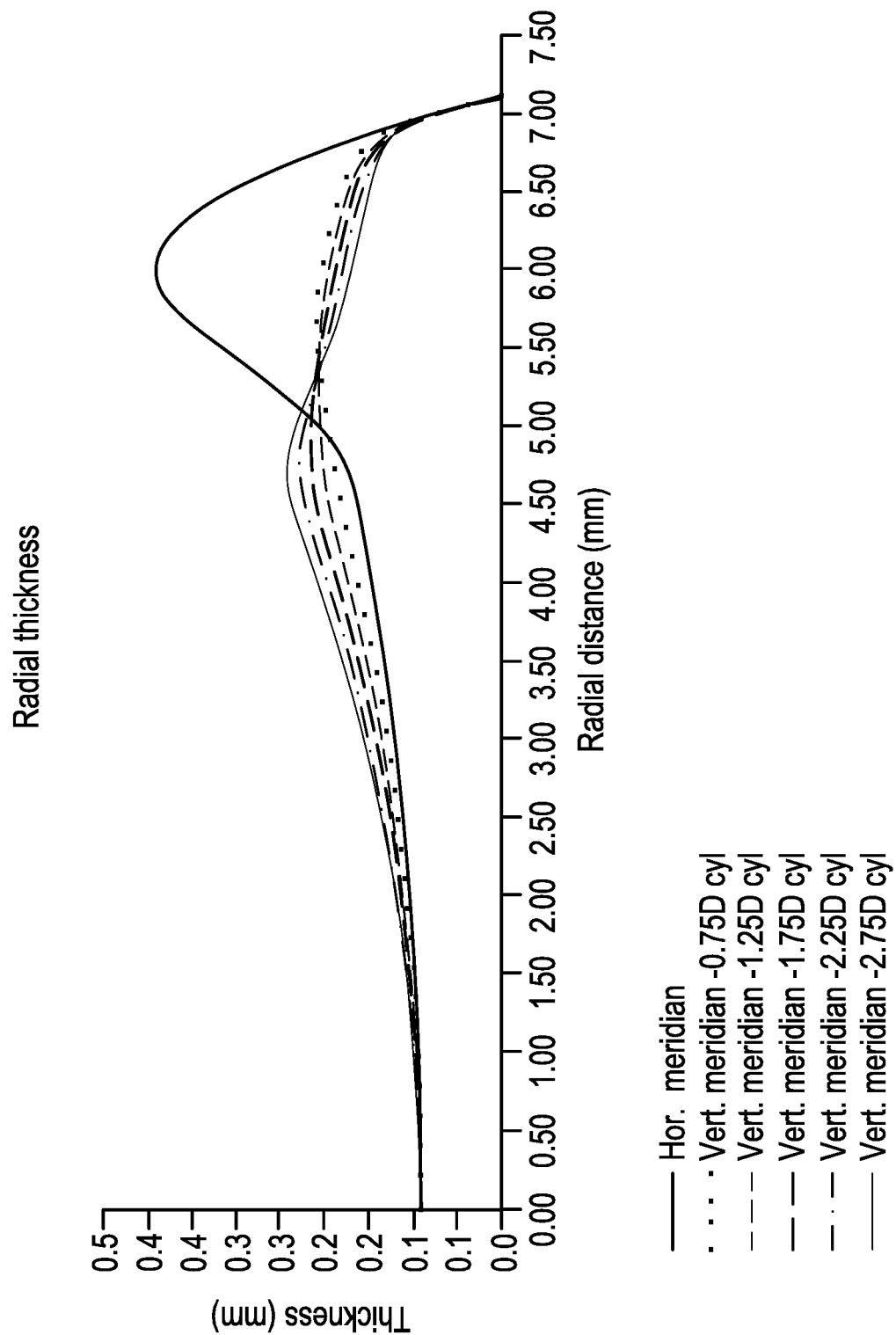

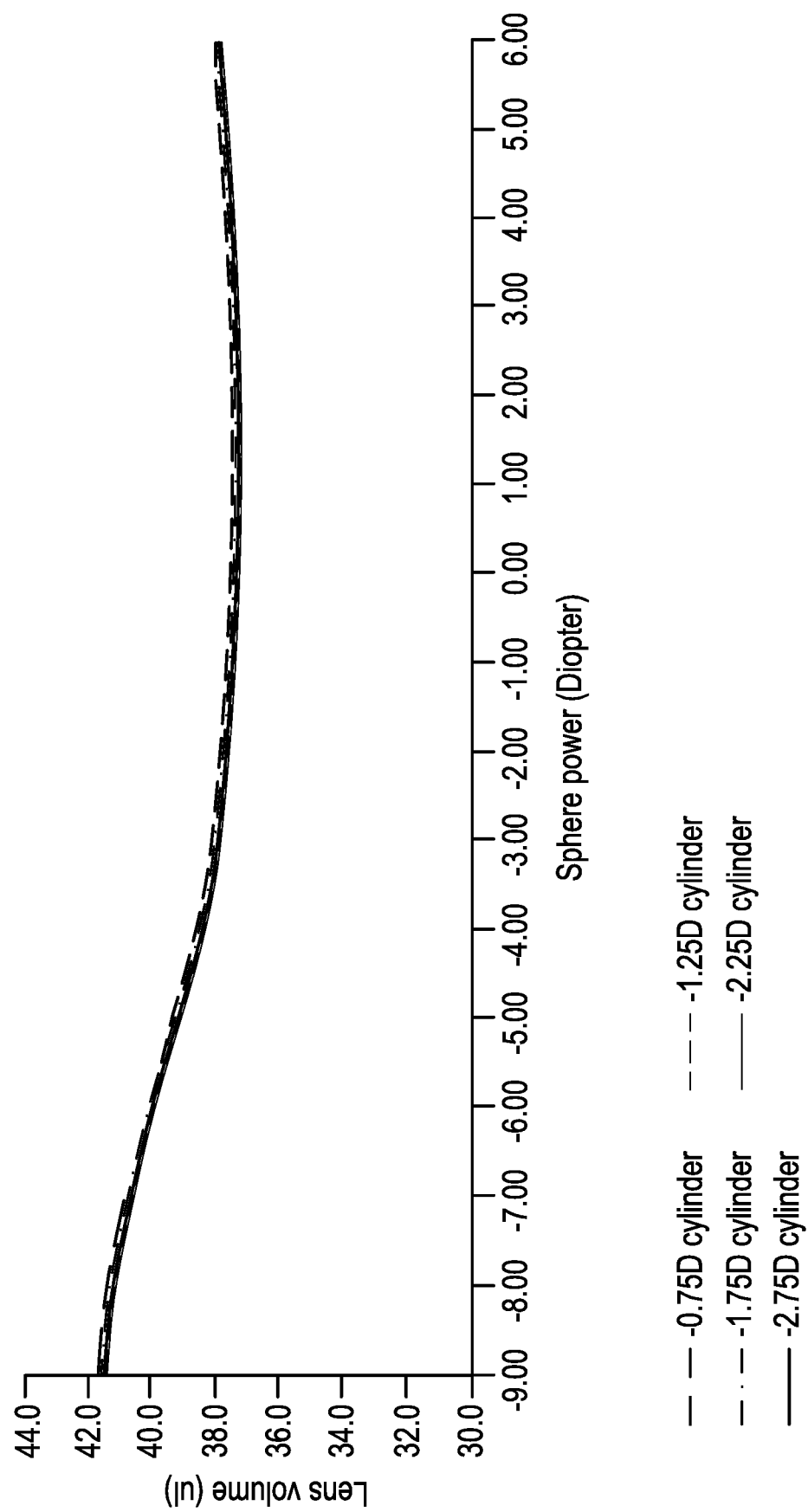

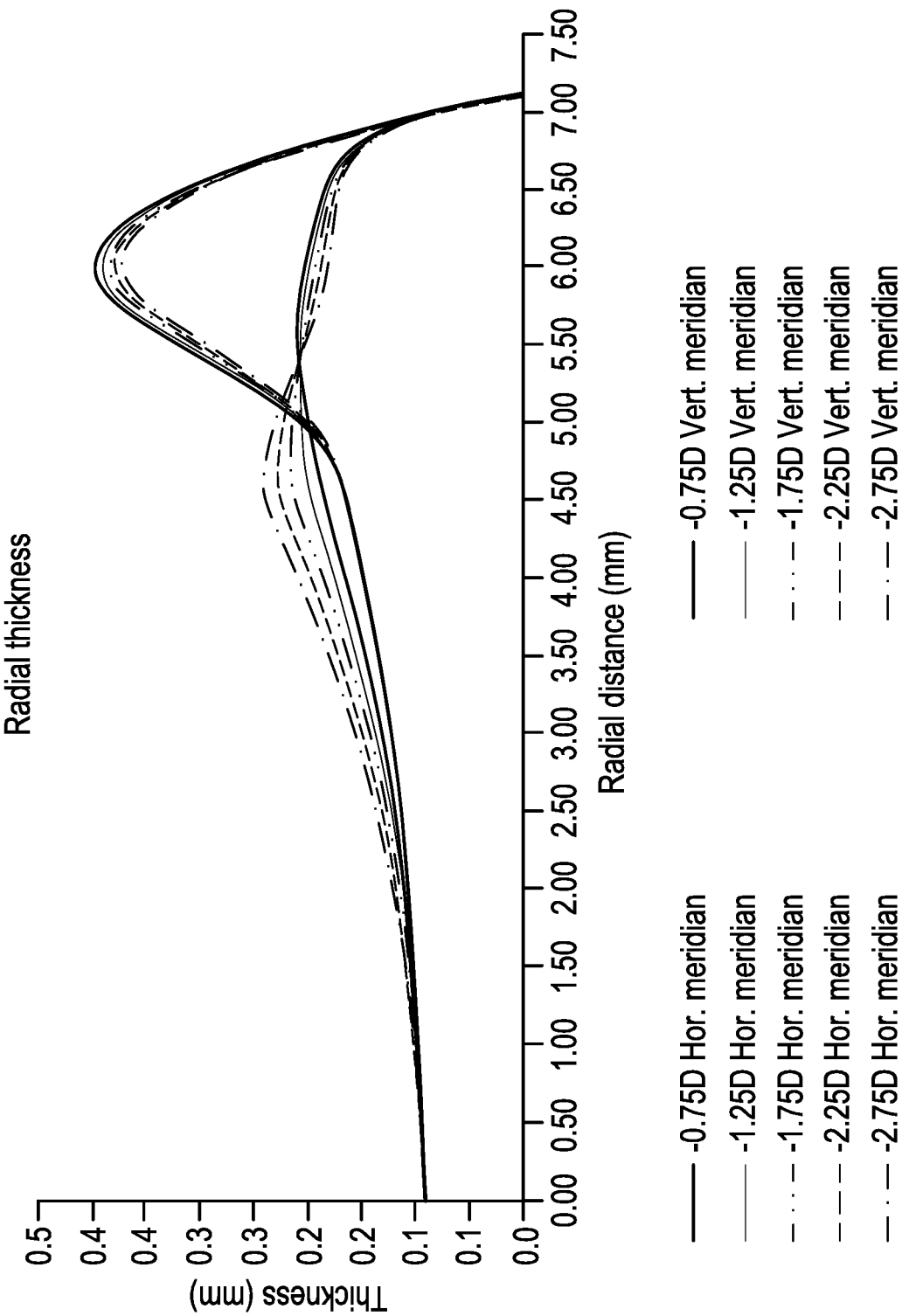

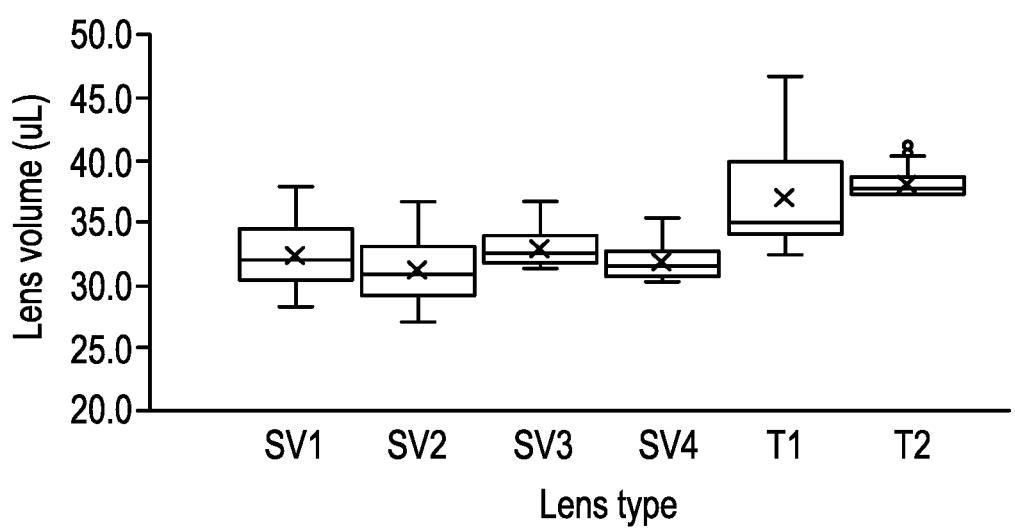

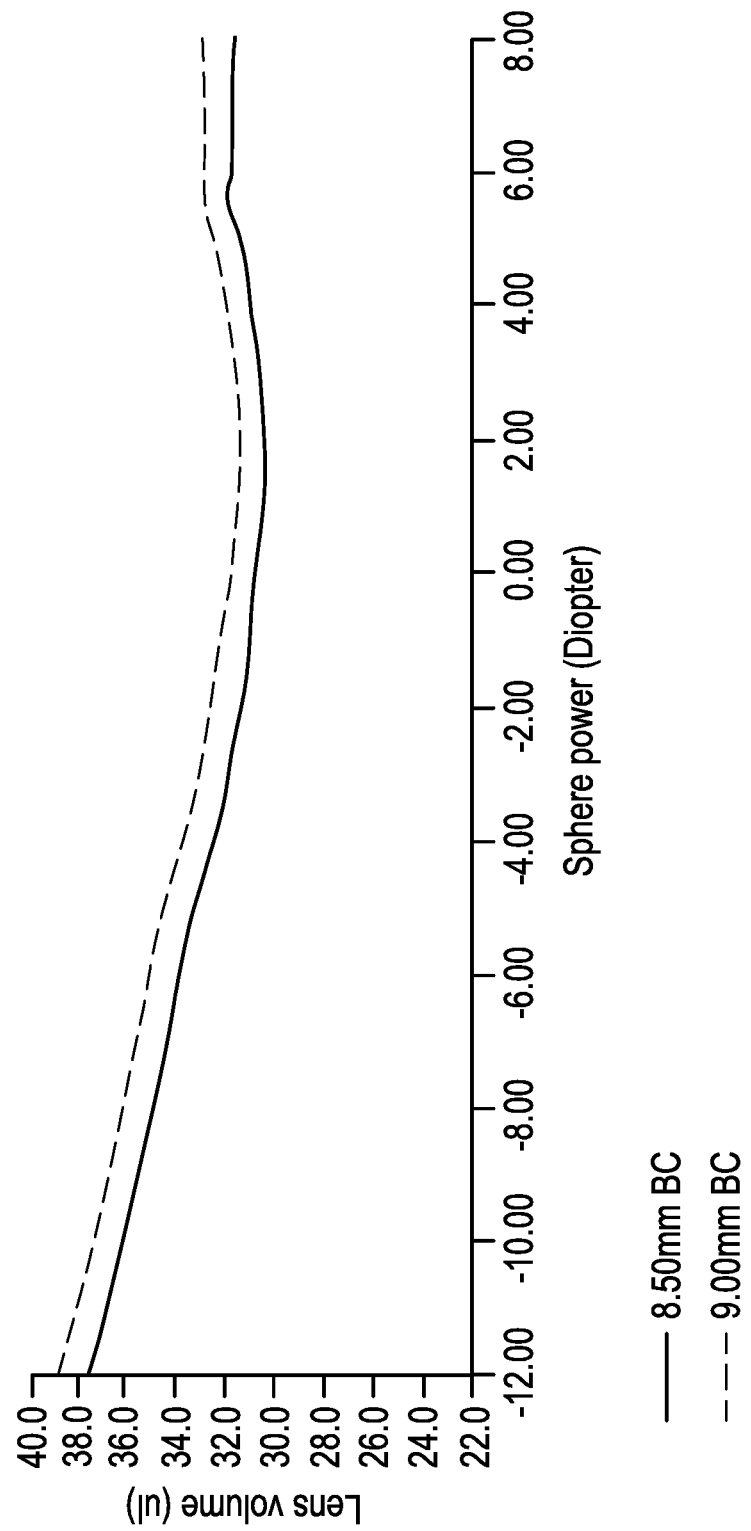

SOFT CONTACT LENS WITH REDUCED VOLUME VARIATION

BACKGROUND

Soft contact lenses, whether designed to provide simple vision correction, such as myopia or hyperopia, or more complex vision correction such as presbyopia, astigmatism or high order aberration correction, are based on the rules of refraction (Snell's law of refraction). The amount of correction may be determined from a combination of a back optic zone geometry, a front optic zone geometry, a center thickness, and a material refractive index. Generally, the geometry of a back surface of a lens remains the same across a stock keeping unit (SKU) range of lenses unless the lens is customized. The back surface, also called base curve, may determine fitting performance. Usually, more than one base curve is available for single vision lenses due to the limited number of SKUs to manage. Therefore, a practitioner may select a base curve that provides a best fit on a particular eye.

Lenses may be designed such that their mechanical performance remains independent from a prescribed vision correction to provide performance consistency across a SKU range. Provided that the required power is obtained by changing the geometry of a front surface, that change in geometry may introduce a variation in lens volume across the SKU range. For soft contact lenses that are rotationally symmetrical, variation in volume may range from 25% to 50% for SKUs ranging from −12.00D to +8.00D or within 20% to 45% for SKUs ranging from −9.00D to +6.00D (the SKU range generally provided for most toric products). Usually, a sphere power range provided for a toric product is smaller than for a single vision lens due to a large number of SKUs to manage from multiple cylinder power and cylinder axis combinations. The largest volumes may be observed for extreme SKUs, such as high minus power lenses (lenses with sphere power below −6.0D) and high plus power lenses (lenses with sphere power above +6.0D). The smallest volumes occur for low power lenses, such as lenses around the plano sphere power.

A lens volume may be initially driven by lens material properties, and, more specifically, material stiffness. A lens made with a stiffer material may present the same stiffness properties with a thinner thickness profile as a lens with a softer material. Thus, a lens made with a stiff material might present less lens volume than a lens made with a soft material for the same SKU, base curve, and diameter combination. However, within the same SKU range, lenses made with a stiff material might present more volume variation than lenses made with a soft material. The lens volume also may be driven by a base curve and diameter combination. Lenses with larger diameter and stepper base curve may carry more volume.

Soft toric contact lenses may present less volume variation across an associated SKU range within a given cylinder correction. Thick zones for angularly stabilizing a lens on an eye may add material to the lens, whether stabilization zones are of a ballast type or dual stabilization zones. A change in geometry in an optic zone, for a given cylinder correction, represents a smaller change in volume compared to an overall lens volume, thus reducing overall volume variation. However, if different levels of cylinder correction are considered, and a cylinder may be provided from −0.50D to −2.50D in 0.50D step or from −0.75D to −2.75D in 0.50D step, then the variation in lens volume may drastically increase, similarly to what is seen in rotationally symmetrical lenses.

For many years, soft contact lenses have been used for the sole purpose of vision correction, such as correcting myopia, hyperopia, presbyopia, astigmatism correction or disease related vision loss requiring correction like keratoconus. Recently, use of soft contact lenses has been extended for other than vision correction purposes, such as beauty lenses (e.g., colored lenses), light filtering lenses (e.g., photochromic lenses, blue blocker lenses, etc.), or providing health benefits (e.g., allergy, dry eye, etc.).

Such diversities in the use of soft contact lenses may introduce new constraints in designs, and, more particularly, constraints related to lens volume, which may impact performance of the lenses. Soft toric contact lenses that are usually carrying larger volume than rotationally soft sphere contact lenses may not maintain their performance for such new uses.

Thus, there is a need for improvements.

SUMMARY

Ophthalmic lenses are described herein. An exemplary ophthalmic lens may comprise a first surface. The exemplary ophthalmic lens may comprise a second surface disposed opposite the first surface and defining a volume of lens material therebetween. The ophthalmic lens may exhibit a first cylinder power. A difference of the volume of lens material of the ophthalmic lens and a volume of lens material of a comparative lens may be minimized. The comparative lens may consist essentially of the same lens material as the ophthalmic lens and exhibit a second cylinder power different from the first cylinder power.

Methods are described herein. An exemplary method may comprise forming a first ophthalmic lens having a first front surface and a first back surface disposed opposite the first front surface and defining a first volume of lens material therebetween. The first ophthalmic lens may exhibit a first cylinder power. The exemplary method may comprise forming a second ophthalmic lens having a second front surface and a second back surface disposed opposite the second front surface and defining a second volume of lens material therebetween. The second ophthalmic lens may exhibit a second cylinder power different from the first cylinder power. A difference between the first volume of lens material and the second volume of lens material may be independent of a difference between the first cylinder power and the second cylinder power.

Methods are described herein. Another exemplary method may comprise forming a first ophthalmic lens having a first front surface and a first back surface disposed opposite the first front surface and defining a first volume of lens material therebetween. The first ophthalmic lens may exhibit a first cylinder power. The another exemplary method may comprise forming a second ophthalmic lens having a second front surface and a second back surface disposed opposite the second front surface and defining a second volume of lens material therebetween. The second ophthalmic lens may exhibit a second cylinder power different from the first cylinder power. A difference between the first volume of lens material and the second volume of lens material may be minimized.

BRIEF DESCRIPTION OF THE DRAWINGS

The following drawings show generally, by way of example, but not by way of limitation, various examples discussed in the present disclosure. In the drawings:

FIG. 3 illustrates an exemplary plot showing lens volume for a standard single vision lens covering the −12.00D to +8.00D Rx range.

FIG. 4 illustrates an exemplary toric contact lens where the thickness profile along the vertical meridian is reduced when the prescribed cylinder is increased. The thickness profile along the horizontal meridian remains unchanged.

FIG. 5 illustrates an exemplary plot showing volume for a toric lens designed such that the volume is independent of the amount of the prescribed cylinder.

FIG. 6 illustrates an exemplary toric contact lens where the geometry of the back surface is adjusted according to the amount of prescribed cylinder. The front surface geometry remains unchanged.

FIG. 7 illustrates an exemplary box plot representation of lens volume variation of the provided examples for the single vision and toric soft contact lenses.

FIG. 8 illustrates an exemplary of single vision lenses where the volume variation has been reduced across the −12.0D to +8.0D SKU range.

DETAILED DESCRIPTION

Figure 1:
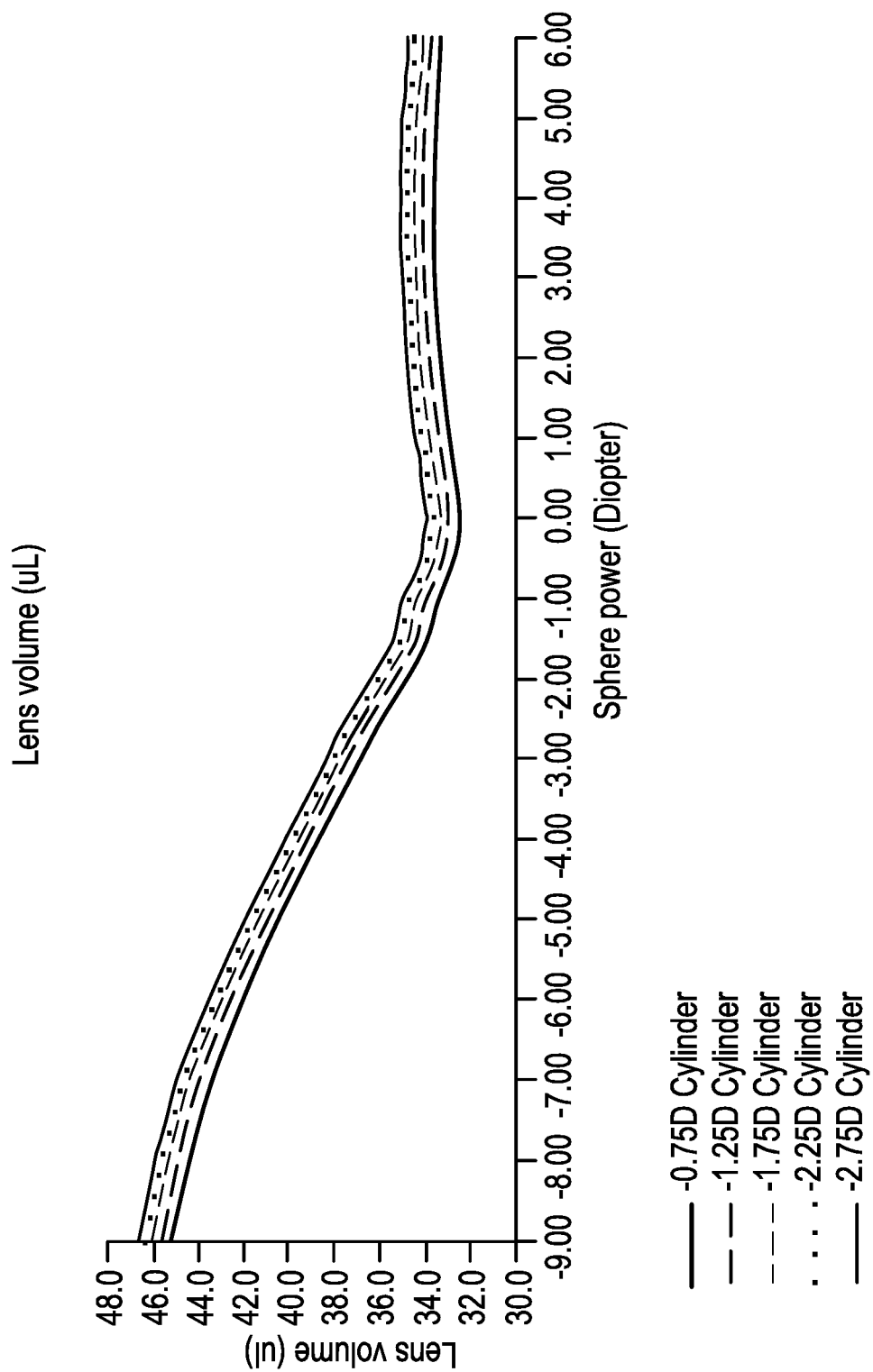
FIG. 1 illustrates an exemplary plot showing lens volume for a standard toric lens using an ASD type stabilization zone covering the −9.00D to +6.00D Rx range with cylinder correction varying from −0.75D to −2.75D.

Described herein are systems and methods for manufacturing contact lenses. Utilizing the systems and/or methods described herein, a volume range of contact lenses may be maintained, regardless of a prescription strength of each contact lens. Each contact lens may comprise a front surface and a back surface. A first contact lens may comprise a first prescription strength, a first geometry associated with a first front surface, a first geometry associated with a first back surface, and a first volume. The first volume may be associated with a first material. The first contact lens may comprise the first material.

A second contact lens may comprise a second prescription strength, a second geometry associated with a second front surface, a second geometry associated with a second back surface, and a second volume. The second volume may be associated with a second material. The second contact lens may comprise the second material. The first prescription strength may be different from the second prescription strength. The second geometry associated with the second front surface may be altered from and based on the first geometry associated with the first front surface. The second geometry associated with the second back surface may be altered from and based on the first geometry associated with the first back surface. Altering the second geometry associated with the second front surface and/or the second geometry associated with the second back surface may comprise ensuring that the second volume is within a predetermined threshold range of the first volume.

An ophthalmic lens may comprise a first surface. The ophthalmic lens may comprise a soft contact lens. The ophthalmic lens may comprise a toric contact lens. The ophthalmic lens may comprise one or more silicone hydrogels. The ophthalmic lens may comprise one or more traditional hydrogels.

The ophthalmic lens may comprise a second surface disposed opposite the first surface and defining a volume of lens material therebetween.

The ophthalmic lens may exhibit a first cylinder power. A difference of the volume of lens material of the ophthalmic lens and a volume of lens material of a comparative lens may be minimized. The comparative lens may consist essentially of the same lens material as the ophthalmic lens and exhibit a second cylinder power different from the first cylinder power.

The difference of the volume of lens material of the ophthalmic lens and the volume of lens material of the comparative lens may be minimized by configuring a geometry of one or more of the first surface and the second surface based on at least the first cylinder power. The difference of the volume of lens material of the ophthalmic lens and the volume of lens material of the comparative lens may be minimized by configuring a geometry of the first surface based on a cylinder power associated with an optic zone of the second surface. The difference of the volume of lens material of the ophthalmic lens and the volume of lens material of the comparative lens may be minimized by configuring one or more of a lens diameter or a base curve of the ophthalmic lens based on at least the first cylinder power.

The difference of the volume of lens material of the ophthalmic lens and the volume of lens material of the comparative lens may be minimized by configuring one or more surface features. The one or more surface features may comprise one or more dimples. The difference of the volume of lens material of the ophthalmic lens and the volume of lens material of the comparative lens may be minimized by configuring one or more internal features. The one or more internal features may comprise one or more internal cavities.

The first cylinder power may comprise a diffractive cylinder power. The first cylinder power may comprise a refractive cylinder power.

A manufacturer may manufacture a first contact lens. The first contact lens may comprise a first cylinder power. The first contact lens may comprise a first front surface. The first front surface may comprise a first front surface geometry. The first contact lens may comprise a first back surface. The first back surface may comprise a first back surface geometry. The first contact lens may comprise a first material. The first material may comprise a first volume.

The manufacturer may manufacture a second contact lens. The second contact lens may comprise a second cylinder power. The second contact lens may comprise a second front surface. The second front surface may comprise a second front surface geometry. The second contact lens may comprise a second back surface. The second back surface may comprise a second back surface geometry. The second contact lens may comprise a second material. The second material may comprise a second volume. The first cylinder power may be different from the second cylinder power. The second front surface geometry and/or the second back surface geometry may be configured such that the second volume is within a predetermined threshold range of the first volume.

A first ophthalmic lens may be formed having a first front surface and a first back surface disposed opposite the first front surface and defining a first volume of lens material therebetween. A manufacturer may form a first ophthalmic lens having a first front surface and a first back surface disposed opposite the first front surface and defining a first volume of lens material therebetween. The first ophthalmic lens may exhibit a first cylinder power. The first cylinder power may be achieved by configuring a geometry of one or more of the first front surface and the first back surface. The first cylinder power may be achieved by configuring a geometry of the first front surface based on a cylinder power associated with an optic zone of the first back surface. The first cylinder power may be achieved by configuring one or more of a lens diameter or a base curve of the ophthalmic lens. The ophthalmic lens may comprise one or more silicone hydrogels. The ophthalmic lens may comprise one or more traditional hydrogels.

A second ophthalmic lens may be formed having a second front surface and a second back surface disposed opposite the second front surface and defining a second volume of lens material therebetween. The manufacturer may form a second ophthalmic lens having a second front surface and a second back surface disposed opposite the second front surface and defining a second volume of lens material therebetween. The second ophthalmic lens may exhibit a second cylinder power different from the first cylinder power.

One or more of the first cylinder power or the second cylinder power may comprise a diffractive cylinder power. One or more of the first cylinder power or the second cylinder power may comprise a refractive cylinder power. One or more of the first ophthalmic lens or the second ophthalmic lens may comprise a soft contact lens. One or more of the first ophthalmic lens or the second ophthalmic lens may comprise a toric contact lens.

The first ophthalmic lens and/or the second ophthalmic lens may comprise one or more surface features. The one or more surface features may comprise one or more dimples. The first ophthalmic lens and/or the second ophthalmic lens may comprise one or more internal features. The one or more internal features may comprise one or more internal cavities.

A difference between the first volume of lens material and the second volume of lens material may be independent of a difference between the first cylinder power and the second cylinder power.

A manufacturer may manufacture a first contact lens. The first contact lens may comprise a first cylinder power. The first contact lens may comprise a first front surface. The first front surface may comprise a first front surface geometry. The first contact lens may comprise a first back surface. The first back surface may comprise a first back surface geometry. The first contact lens may comprise a first material. The first material may comprise a first volume.

The manufacturer may manufacture a second contact lens. The second contact lens may comprise a second cylinder power. The second contact lens may comprise a second front surface. The second front surface may comprise a second front surface geometry. The second contact lens may comprise a second back surface. The second back surface may comprise a second back surface geometry. The second contact lens may comprise a second material. The second material may comprise a second volume. The first cylinder power may be different from the second cylinder power. The second front surface geometry and/or the second back surface geometry may be configured such that the second volume is within a predetermined threshold range of the first volume.

A first ophthalmic lens may be formed having a first front surface and a first back surface disposed opposite the first front surface and defining a first volume of lens material therebetween. A manufacturer may form a first ophthalmic lens having a first front surface and a first back surface disposed opposite the first front surface and defining a first volume of lens material therebetween. The first ophthalmic lens may exhibit a first cylinder power.

A second ophthalmic lens may be formed having a second front surface and a second back surface disposed opposite the second front surface and defining a second volume of lens material therebetween. The manufacturer may form a second ophthalmic lens having a second front surface and a second back surface disposed opposite the second front surface and defining a second volume of lens material therebetween. The second ophthalmic lens may exhibit a second cylinder power different from the first cylinder power.

One or more of the first cylinder power or the second cylinder power may comprise a diffractive cylinder power. One or more of the first cylinder power or the second cylinder power may comprise a refractive cylinder power. One or more of the first ophthalmic lens or the second ophthalmic lens may comprise a soft contact lens. One or more of the first ophthalmic lens or the second ophthalmic lens may comprise a toric contact lens. One or more of the first ophthalmic lens or the second ophthalmic lens may comprise one or more silicone hydrogels. One or more of the first ophthalmic lens or the second ophthalmic lens may comprise one or more traditional hydrogels.

A difference between the first volume of lens material and the second volume of lens material may be minimized. A difference between the first volume of lens material and the second volume of lens material may be minimized by configuring a geometry of one or more of the first front surface or the first back surface based on at least the first cylinder power and a geometry of one or more of the second front surface or the second back surface based on at least the second cylinder power. A difference between the first volume of lens material and the second volume of lens material may be minimized by configuring a geometry of the first front surface based on a cylinder power associated with an optic zone of the first back surface and a geometry of the second front surface based on a cylinder power associated with an optic zone of the second back surface.

A difference between the first volume of lens material and the second volume of lens material may be minimized by configuring one or more of a lens diameter or a base curve of the first ophthalmic lens based on at least the first cylinder power and the second ophthalmic lens based on at least the second cylinder power. A difference between the first volume of lens material and the second volume of lens material may be minimized by configuring one or more surface features associated with one or more of the first ophthalmic lens or the second ophthalmic lens. The one or more surface features may comprise one or more dimples. A difference between the first volume of lens material and the second volume of lens material may be minimized by configuring one or more internal features associated with one or more of the first ophthalmic lens or the second ophthalmic lens. The one or more internal features may comprise one or more internal cavities.

A manufacturer may manufacture a first contact lens. The first contact lens may comprise a first cylinder power. The first contact lens may comprise a first front surface. The first front surface may comprise a first front surface geometry. The first contact lens may comprise a first back surface. The first back surface may comprise a first back surface geometry. The first contact lens may comprise a first material. The first material may comprise a first volume.

The manufacturer may manufacture a second contact lens. The second contact lens may comprise a second cylinder power. The second contact lens may comprise a second front surface. The second front surface may comprise a second front surface geometry. The second contact lens may comprise a second back surface. The second back surface may comprise a second back surface geometry. The second contact lens may comprise a second material. The second material may comprise a second volume. The first cylinder power may be different from the second cylinder power. The second front surface geometry and/or the second back surface geometry may be configured such that the second volume is within a predetermined threshold range of the first volume.

Systems and methods are disclosed herein for designing soft contact lenses, for example, toric lenses, where lens volume material remains constant independently from an amount of prescribed cylinder built into the lens. Systems and methods are disclosed herein for providing a new soft contact lens with reduced volume variation compared to a standard soft contact lens.

As an example, a soft toric contact lens design is described with reduced volume variation compared to a standard soft toric contact lens design. The reduction of volume variation is achieved either by adjusting the geometry of the front surface across the proposed cylinder range, adjusting the geometry of the back surface according to the amount of prescribed cylinder, or a combination of both.

A contact lens may be defined by a front surface or surface power, a back surface or base curve and an edge. The front and back surface of the lens is described by at least three regions, the inner region from which the vision correction is obtained, the outer periphery of the lens that provides mechanical properties of the lens, and an intermediate region located between the inner region and the outer region used for blending the two aforementioned regions in a smooth manner such that discontinuities do not occur.

The optical zone is defined as the substantially central portion of the lens which contains the visual power correction for the wearer's ametropia and/or presbyopia. Ametropia is defined as the optical power needed to provide good visual acuity, generally at far distance. It is recognized that this would include myopia or hyperopia. Presbyopia is corrected by adding algebraically positive optical power to a portion of the optical zone to correct the wearer near visual acuity requirements. It is recognized that these optical powers may be created by refractive means, or diffractive means, or both. The power correction can also include astigmatism correction in combination with the previously mentioned vision corrections.

The peripheral zone provides stabilization of the lens on the eye including, centration and orientation. That region of the lens also provides the mechanical properties such as handling properties, related to ease of insertion and ease of removal, comfort and fit. The lens tightness on the eye drives either a loose fit which could lead to too much movement or a tight fit which could lead to not enough movement. Orientation stabilization is fundamental when the optical zone contains non-rotationally symmetric features, such as astigmatic correction and/or high order aberrations correction. The intermediate zone ensures that the optical zone and the peripheral zone are blended with tangent curves. It is important to note that both the optical zone and the peripheral zone can be designed independently, though sometimes their designs are strongly related when specific requirements are necessary. For example, the design of a toric lens with an astigmatic optical zone might require a peripheral zone for keeping the lens at a predetermined orientation on the eye.

Figure 2A:
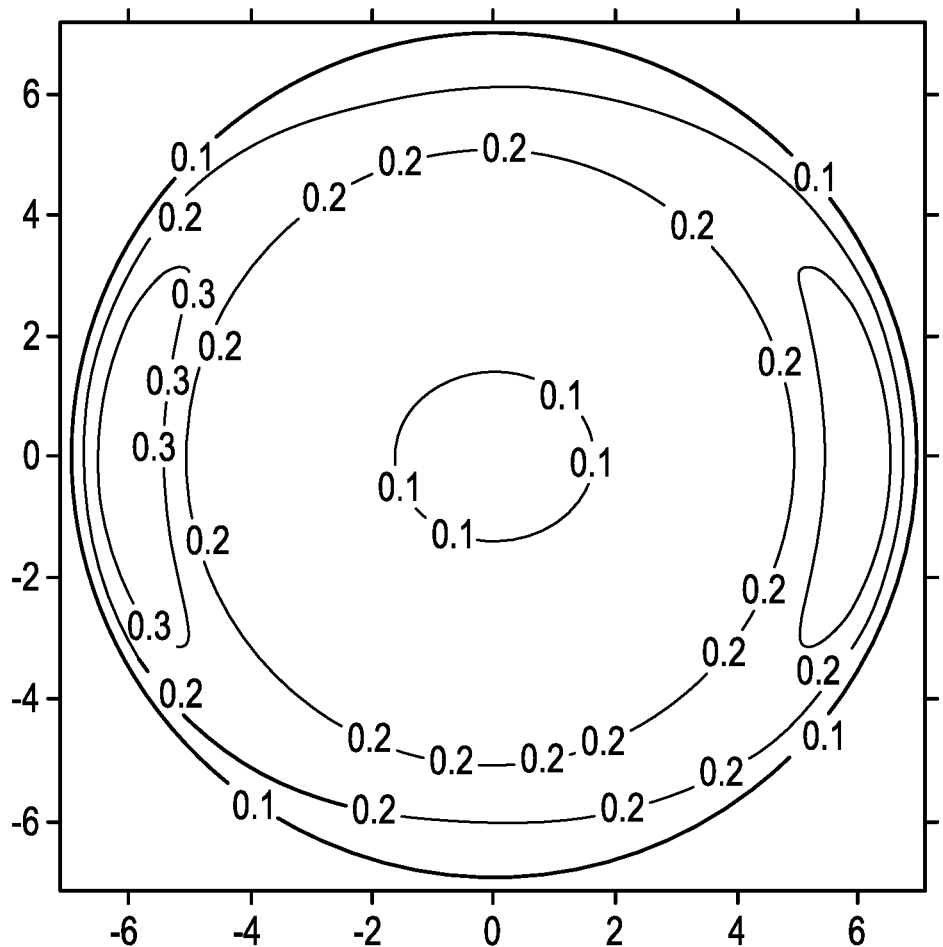
FIGS. 2A-2C illustrate exemplary contour plots of a soft toric contact lens using dual stabilization zone as a mean to maintain angular orientation on eye.
Figure 2B:
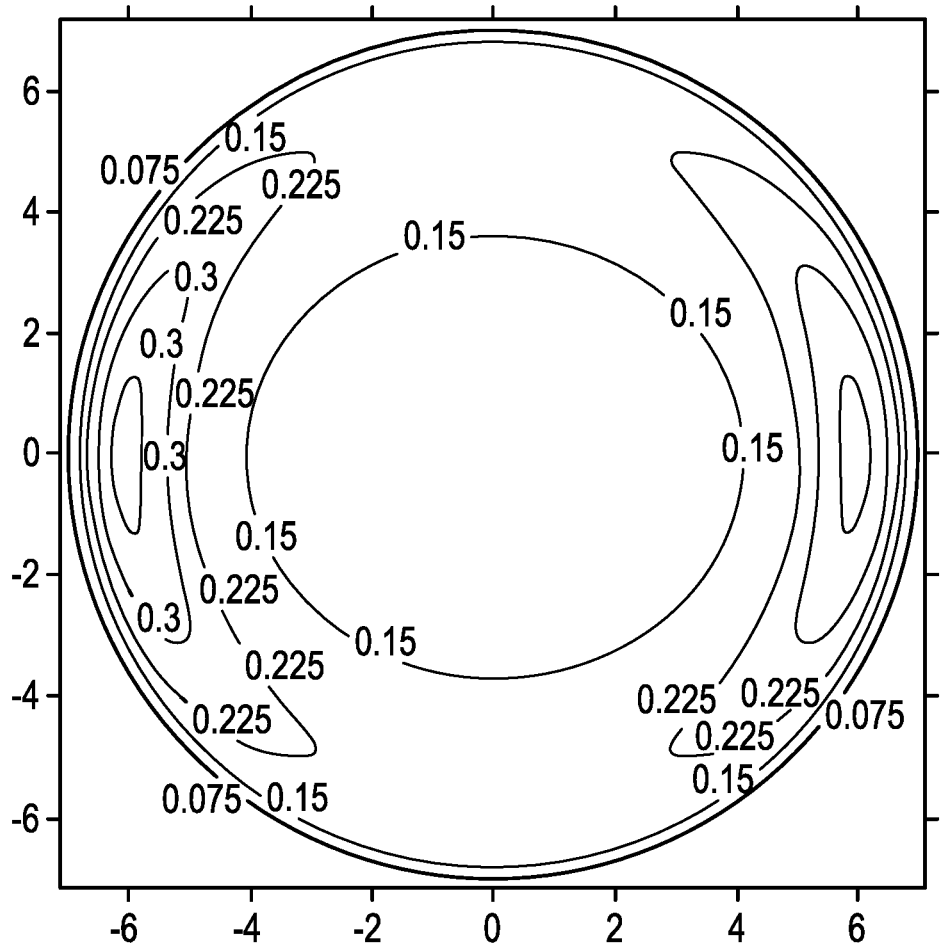
Figure 2C:
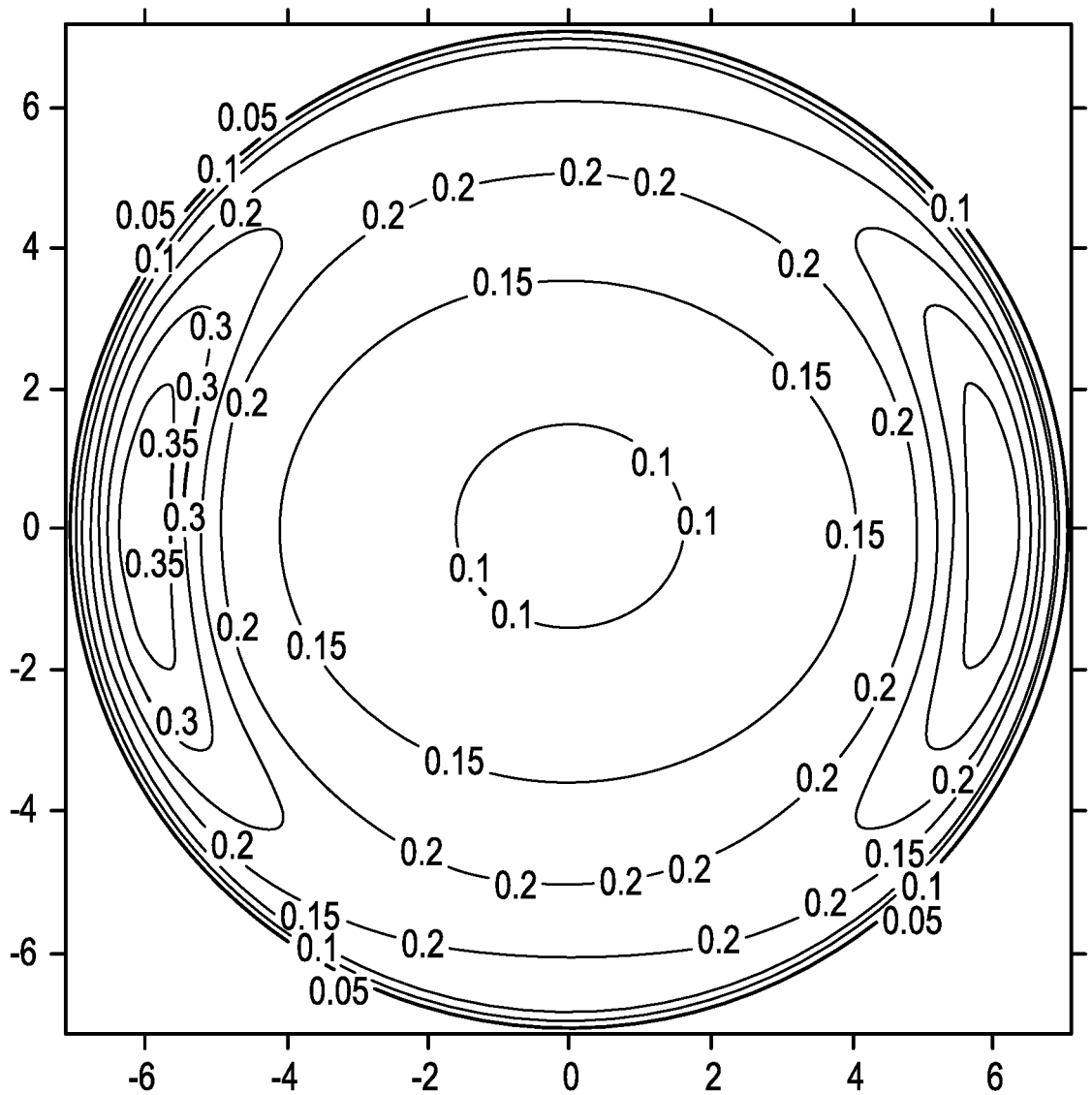

Generally, the astigmatism correction is built on the back surface side of a soft contact lens. The basic geometry of the back optic zone consists of a toric surface where the flattest radius in combination with the radius of the front surface provides the sphere power correction (sphere meridian), and the steepest radius of the back optic zone, oriented at 90 degrees from the flattest radius, provides the astigmatism correction (cylinder meridian). The amount of astigmatism corrected depends on the difference in curvature between the flattest and steepest meridian. Thus, for the same geometry of the front surface, higher level of astigmatism correction will require steeper radius of curvature along the cylinder meridian. The increase in curvature will result in an increase in volume for the same sphere power. The cylinder axis, obtained by setting the axis of the toric surface to the desired orientation according to the targeted prescription does not affect the volume of the lens. FIG. 1 illustrates an example of lens volume for a soft toric contact lens using a dual stabilization zone as a mean to maintain lens angular orientation on eye. The lens has a 14.30 mm diameter and an equivalent base curve of 8.50 mm. The maximum peripheral thickness in the stabilization zone region is about 0.375 mm. The provided vision correction ranges from −9.00D to +6.00D every 0.25D for the sphere power and −0.75D to −2.75D for the cylinder with 0.50D increment. FIGS. 2A-2C are contour plots of a soft toric contact lens (−3.00D/−0.75D @ 180 deg.) using dual stabilization zone as a mean to maintain angular orientation on eye. In the provided example, even if the lens volume change does not exceed 4.5% for a given SKU across the provided astigmatism correction, the total volume variation within the full SKU range is about 44%.

In comparison, FIG. 3 presents the volume of a single vision soft contact lens at two different base curves, 8.50 mm and 9.00 mm, for the same SKU range for the sphere power. The maximum peripheral thickness is about 0.215 mm. The total volume variation within the full SKU range for the 8.50 mm base curve and 9.00 mm base curve is about 45% and 46% respectively.

In the provided examples the variation in volume is about the same magnitude between the toric lens and single vision lens. Lens volume is the result of the combination of multiple factors such as choice of material, base curve, diameter, center thickness, peripheral thickness geometry and so on. Thus, the volume itself and its variation across the targeted SKU range might differ from what is presented in the proposed examples. Those variations in volume can be detrimental to the product performance intent and/or its manufacturing process and more particularly for toric lenses where the addition of the astigmatic correction introduces an extra level of volume variation across the entire SKU range. Thus, reducing the volume variation will provide multiple benefits and more particularly for lenses where lens performance across SKUs is highly related to lens volume.

For example, if the lens manufacturing is based on molding, spin casting or other type of process sensitive to lens volume and/or volume variation then there is a benefit at reducing lens volume variation. Another benefit will be for lenses containing an active or inactive ingredient added to the monomer mix or to the packaging solution.

If the amount of active/inactive ingredient dispensed is related to the volume of the lens, then a design presenting less volume variation might also provide less complexity for manufacturing such lenses. Others benefits for such lenses include soft contact lenses where cosmetic appearance is a key criterion for that lens. Colored lenses and photochromic lenses are examples of such lenses. Also lenses where material properties such as absorbance is critical to performance will benefit of the proposed solution.

In a first exemplary embodiment, the reduction of the volume variation is achieved by adjusting the front surface geometry according to the amount of cylinder prescribed on the back surface optic zone. Because toric lenses require angular stability, changes on the front surface of the lens must be done without impacting such aspect of the lens. Toric lenses with higher astigmatism correction also require better angular stability and angular repeatability than toric lenses with lower astigmatism correction. Subjects with a large amount of astigmatism are more sensitive to lens angular misalignment than subjects with less astigmatism for the same angular misalignment. Thus, the design changes on the front surface are preferably done such that the angular stability and angular repeatability are improved the larger the prescribed cylinder is.

Angular stability relates to how much angular variation the lens has when worn by the subject once the lens reached its final angular resting position. The smaller the angular variations are the better the angular stability of the lens is.

Angular repeatability relates to how much angular variation the lens has for its angular resting position. The more consistent the angular resting position is between subjects or within the same subject the better the angular repeatability of the lens is.

In a first example, the toric lens is a dual stabilization zones type design. The volume variation related to the prescribed cylinder are eliminated by means of varying the peripheral thickness along the 90 degree meridian to cancel out the volume change induced by the change in the geometry of the back surface adjusted according to the amount of prescribed cylinder power. In the proposed example the thickness profile along the 0 degree meridian of the peripheral region remains unchanged across the SKUs. Thus, the maximum thickness along that meridian is kept constant across the SKUs. The thickness profile along the 90 degree meridian in the peripheral region is adjusted according to the amount of prescribed cylinder power such that the induced volume change, coming from the back surface, is compensated by changing the profile of the front surface along the 90 degree meridian. The adjustment of the geometry of that meridian drives the overall angular thickness change along these two meridians.

If we define the thickness differential as the difference in thickness between the maximum thickness in the peripheral region along the 0 degree meridian and the thickness at the same radial location along the 90 degree meridian, then in the proposed example the thickness differential will increase with the increase of the prescribed cylinder power. It is known that large thickness differential provides better rotation performance and stability than small thickness differential for dual stabilization zone type design. Thus, improving angular stability and angular repeatability for larger prescribed cylinder is achieved. FIG. 4 depicts the thickness profiles of such lens where the thickness along the vertical meridian is reduced while the prescribed cylinder is increased. The cylinder axis is along the 90 degree meridian.

FIG. 5 depicts the resulting lens volume achieve using the proposed approach. The volume change is independent of the amount of prescribed cylinder. The variation in volume is only driven by the change in sphere power correction. The volume variation in percent is about 11%. Further reduction in volume variation can be obtained by adjusting other parameters driving the geometry of the front surface such as center thickness, front optic zone diameter, or thickness at the edge of the front optic zone.

Similar outcome can be obtained by changing the maximum thickness while keeping constant the thickness profile along the vertical meridian. This solution also provides larger thickness differentials for larger prescribed cylinders.

Another option is to change both the maximum thickness along the horizontal meridian and the thickness profile along the vertical meridian such that the thickness profile increases with an increase of the prescribed cylinder.

The same principle can be applied on toric soft contact lenses for which the angular stability and angular repeatability is achieved using a different approach.

Other criteria can also be considered during the lens design process such as lens inversion, lens folding, lens wrapping usually evaluated through FEA modeling. Such criteria, related to the lens mechanical performance, can also be included during the process of optimizing the geometry of the front surface according to the desired lens performance.

In a second exemplary embodiment, the reduction of the volume variation is achieved by adjusting the back surface geometry according to the amount of cylinder prescribed on the back surface. The front surface geometry remains unchanged.

The increase in volume that would result from the change in geometry along the cylinder meridian within the back optic zone is balanced by either adjusting the back optic zone diameter and/or adjusting the blending region and/or the back peripheral region. The blending region and back peripheral region can be adjusted either by changing their overall curvature, their width, their Sagittal depth, or a combination of all three. Preferably the total sagittal depth of the back surface should not change.

For example, one proposed approach to reduce the variation in volume due to the change in geometry of the back optic surface is to reduce the back optic zone diameter of the largest prescribed cylinder powers such that the sagittal depth along the cylinder meridian matches the sagittal depth along the sphere meridian. The remaining variations in volume can be eliminated by adjusting either the blending region and/or the back peripheral region.

Such variations in the geometry of the back surface across the cylinder range are too small to have an impact on lens wrapping and lens fit as those changes are much smaller in geometry than the geometrical change we are seeing in the eye geometry of the general population.

FIG. 6 depicts the thickness profiles of such lens where the back surface geometry is adjusted according to the amount of cylinder power prescribed on the back optic zone, the cylinder axis is set along the 90 degree meridian. The front surface remains unchanged and matches the front surface geometry of the previous example. The resulting lens volume is identical as the −0.75D prescribed cylinder. Thus, the lens volume is the same as what is presented in FIG. 5.

In the proposed example, the outer geometry of the back surface is adjusted for each level of prescribed cylinder. Because this region is rotationally symmetrical and that the front surface does not change, the resulting radial thickness varies for each individual cylinder power level as shown on FIG. 6 but the resulting thickness differential remains constant providing angular stability and angular repeatability across the entire SKU range.

FIG. 7 is a box plot summarizing the volume variations across the same SKU range (−9.00D to +6.00D) for different types of contact lenses. Volume data labeled as SV1 and SV2 refers to the previously mentioned single vision lenses with respective base curve radius of 8.50 mm (SV1) and 9.00 mm (SV2). Lenses labeled as SV3 (8.50 mm BC) and SV4 (9.00 mm BC) are single lenses with reduced volume variation of the previously mentioned example. T1 corresponds to the soft toric contact lens using a dual stabilization zone of FIGS. 1, and T2 corresponds to the soft toric contact lens designed based on the first proposed approach for reducing volume variation.

This principle can be applied on toric soft contact lenses for which the angular stability and angular repeatability is achieved using a different approach.

Other criteria can also be considered during the lens design process such as lens inversion, lens folding, lens wrapping usually evaluated through FEA modeling. Such criteria, related to the lens mechanical performance, can also be included during the process of optimizing the geometry of the back surface according to the desired lens performance.

FIG. 8 presents the volume of a single vision soft contact lens at two different base curves, 8.50 mm and 9.00 mm sharing the same basic geometrical characteristics (base curve geometry, optic zone diameter, lens diameter) as the single vision lenses of FIG. 3. The center thickness and peripheral thickness were adjusted to reduce the volume variation. The volume variation within the full SKU range (−12.0D to +8.00D) for the 8.50 mm base curve and 9.00 mm base curve is about 26% and 24% respectively. This corresponds to a reduction of 43% and 48% respectively compared to the original volume data provided in FIG. 3.

Other driving parameters beside center thickness and peripheral thickness can be adjusted to reduce the volume variation such as the optic zone diameter. The choice of the parameters will depend on the targeted performance and the use of the contact lens.

While the example of the first embodiment provides the flexibility of adjusting the angular stability and the angular repeatability across the cylinder range, it increases the number of front surfaces to design and results in more complexity for manufacture. The number of tool/parts to manage are associated with the front surface side is much larger. The advantage of the second approach is that it does not require different fronts for each cylinder power level and results in the same level of complexity as a standard toric lens. However, this solution does not provide the ability to adjust the desired performance in angular stability and the angular repeatability per cylinder level.

In a third exemplary embodiment a compromise can be made by combining the two proposed solutions. It reduces the manufacturing complexity of the first embodiment by limiting the number of front surfaces to design and by adjusting the geometry of the back surface to remove the volume variation induced by the difference in geometry between the front surfaces. For example, a set of two front surfaces can be designed to accommodate for the desired lens performance within a given prescribed cylinder range. A minimum of two specific sets of fronts can be designed across the cylinder range as shown in Table 1A and 1B below. If ultimately a specific set of fronts and backs (Table 1C below) is designed for every single level of prescribed cylinder powers thus the solution corresponds to the first proposed exemplary embodiment.

TABLE 1A

|  |  | Front | Back |
|---|---|---|---|
| Cylinder Range | −0.75 | Front #1 | Back #1 |
|  | −1.25 |  | Back #2 |
|  | −1.75 | Front #2 | Back #3 |
|  | −2.25 |  | Back #4 |
|  | −2.75 |  | Back #5 |

TABLE 1B

|  |  | Front | Back |
|---|---|---|---|
| Cylinder Range | −0.75 | Front #1 | Back #1 |
|  | −1.25 |  | Back #2 |
|  | −1.75 |  | Back #3 |
|  | −2.25 | Front #2 | Back #4 |
|  | −2.75 |  | Back #5 |

TABLE 1C

|  |  | Front | Back |
|---|---|---|---|
| Cylinder Range | −0.75 | Front #1 | Back #1 |
|  | −1.25 | Front #2 | Back #2 |
|  | −1.75 | Front #3 | Back #3 |
|  | −2.25 | Front #4 | Back #4 |
|  | −2.75 | Front #5 | Back #5 |

Although it may be desirable to have the same base curve/diameter combination across the SKU range, a change in one or both of those parameters can be applied to remove the volume variation induced by the prescribed cylinder. For example, the lens diameter can be reduced with the increase of the prescribed cylinder, or the diameter can be increased for low cylinder powers and reduced for large cylinder powers if the nominal diameter is set in the middle of the cylinder range. A similar strategy can be used with the base curve. For example, the base curve can be flattened with the increase of the prescribed cylinder power, or base curve can be steepened for low cylinder powers and flattened for large cylinder powers if the nominal base curve is set in the middle of the cylinder range.

In another exemplary embodiment, the volume variation can be canceled out by adding surface features (e.g., as described in U.S. Pat. No. 9,389,434, hereby incorporated herein by reference in its entirety). The size and the frequency of those features can be adjusted according to the amount of volume to manage. The types of features are not limited to what is proposed in the mentioned patent. It can be any types of surface feature allowing volume control through material removal. It can also be internal features such that internal cavities for example within the body of the lens also allowing volume control through material removal.

In another exemplary embodiment, the volume variation can be canceled out using diffractive optics to provide the required amount of prescribed cylinder. There is a benefit at using a diffractive approach because a diffractive optical zone can create power at the surface of a lens that is independent from the surface shape. The volume variations induced by the diffractive pattern across the cylinder range will be significantly small compared to the volume variation obtained when the prescribed cylinder is achieved using refractive power.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

What is claimed is:
1. An ophthalmic lens comprising:
a first surface; and a second surface disposed opposite the first surface and defining a volume of lens material therebetween, wherein the ophthalmic lens exhibits a first cylinder power, and wherein a difference of the volume of lens material of the ophthalmic lens and a volume of lens material of a comparative lens is minimized, wherein the comparative lens comprises a comparative first surface and a comparative second surface opposite the comparative first surface that define a volume of comparative lens material therebetween consisting essentially of the same lens material as the ophthalmic lens, wherein the comparative lens exhibits a second cylinder power different from the first cylinder power, and wherein a geometry of one or more of the first surface and the second surface is configured based on at least the difference between the second cylinder power and the first cylinder power to minimize the difference between the volume of lens material of the ophthalmic lens and the volume of lens material of the comparative lens due to the difference between the second cylinder power and the first cylinder power.

2. The ophthalmic lens of claim 1, wherein a geometry of the first surface and the comparative first surface are substantially the same and wherein the difference of the volume of lens material of the ophthalmic lens and the volume of lens material of the comparative lens is minimized by configuring a geometry of the second surface based on at least the first cylinder power.

3. The ophthalmic lens of claim 1, wherein the difference of the volume of lens material of the ophthalmic lens and the volume of lens material of the comparative lens is minimized by configuring a geometry of the first surface based on a cylinder power associated with an optic zone of the second surface.

4. The ophthalmic lens of claim 1, wherein the difference of the volume of lens material of the ophthalmic lens and the volume of lens material of the comparative lens is minimized by configuring one or more of a lens diameter or a base curve of the ophthalmic lens based on at least the first cylinder power.

5. The ophthalmic lens of claim 1, wherein the difference of the volume of lens material of the ophthalmic lens and the volume of lens material of the comparative lens is minimized by configuring one or more surface features.

6. The ophthalmic lens of claim 1, wherein the difference of the volume of lens material of the ophthalmic lens and the volume of lens material of the comparative lens is minimized by configuring one or more internal features.

7. The ophthalmic lens of claim 1, wherein the first cylinder power comprises a diffractive cylinder power.

8. The ophthalmic lens of claim 1, wherein the first cylinder power comprises a refractive cylinder power.

9. The ophthalmic lens of claim 1, wherein the ophthalmic lens comprises a soft contact lens.

10. The ophthalmic lens of claim 1, wherein the ophthalmic lens comprises a toric contact lens.

* * * * *